United States Patent [19]

Kuei-Wen

[11] Patent Number: 4,694,597
[45] Date of Patent: Sep. 22, 1987

[54] ELECTRIC PERPETUAL CALENDAR

[76] Inventor: Sheu Kuei-Wen, No. 160, Chin Chou St., Taipei City, Taiwan

[21] Appl. No.: 788,204

[22] Filed: Oct. 15, 1985

[51] Int. Cl.⁴ .............................................. G09D 3/10
[52] U.S. Cl. ....................................... 40/117; 40/112; 40/471
[58] Field of Search ................. 40/112, 471, 117, 347, 40/518

[56] References Cited

U.S. PATENT DOCUMENTS

| 19519 | 3/1858 | Skinner | 40/112 |
| 2,458,092 | 1/1949 | Morris | 40/112 |
| 2,719,372 | 10/1953 | Wolfang | 40/112 |
| 2,886,910 | 5/1959 | Koci | 40/112 |

Primary Examiner—Gene Mancene
Assistant Examiner—Wenceslao J. Contreras
Attorney, Agent, or Firm—Asian Pacific International Patent and Trademark Office

[57] ABSTRACT

A perpetual calendar, particularly a perpetual calendar that can be electrically operated to show the date, the week-day, and the month. The calendar comprises a round wheel or case driven by a gear to rotate one cycle per 24 hours, and the peripheral edge of the round case has a cam for contacting a micro-switch which can trigger a circuit to drive a motor for rotating an eccentric wheel. A retractable rod can be driven by a pin on the eccentric wheel and move downwards to pull the date pulling rod and the week-day pulling rod downwards, and then a ratchet wheel will be driven to rotate, and a positioning piece in the notch of the ratchet wheel will cause the loose-leaves showing date and week-day to advance. A control lever can be engaged in a notch of the month pulling rod, and with the notch of a wheel, the month pulling rod will be pulled downwards by the control lever, through the rotation of the ratchet wheel, to change the month, thereby cyclically and automatically changing the date, the week-day and the month.

4 Claims, 5 Drawing Figures

ELECTRIC PERPETUAL CALENDAR

BACKGROUND OF THE INVENTION

In the conventional perpetual calendars, one can manually change date, week-day, and month by replacing a group of pages everday. In case of loss of the date and week-day, or when a long period of time has lapsed, the calendar may become useless or very difficult to reset, and therefore it is deemed not an ideal perpetual calendar. Another kind of perpetual calendar can have its date, week-day, and month changed by a rotating means operated manually every day; it is considered also as being not a practical perpetual calendar because one can easily forget to make a proper change of dates.

SUMMARY OF THE INVENTION

In view of the disadvantages of the conventional perpetual calendars, the inventor has, through repeated studies and tests, developed the present invention, of which the prime feature is a round case driven by a gear to rotate one cycle per 24 hours. The outer edge of the round case is furnished with a cam for touching a microswitch to trigger a circuit, which will drive a motor to rotate an eccentric wheel. A pin on the eccentric wheel can drive a retractable rod to move downwards to pull the date and week-day pulling rods downwards. Upon the pulling rods being moved downwards, a ratchet wheel will be driven to rotate, and a positioning piece engaged by the tooth of the ratchet wheel will also cause the loose-leaves to turn so as to change the date and week-day. A control lever engages the notch of the month pulling rod and with the notch of the wheel, the month can be changed upon the ratchet wheel rotating to have the control lever drive the pulling rod downwards; therefore, the data, the week-day and the month will be changed continuously and cyclically.

Another feature of the present invention is that the front end of the retractable rod is furnished with a slot for receiving a pin on the eccentric wheel; the rear end of the retractable rod is connected to the date and week-day pulling rods; also, a fulcrum is furnished at the rear portion of the retractable rod. Upon the motor driving the eccentric wheel to rotate, the pin will drive the retractable rod to move up and down around the fulcrum, and then the rear end of the retractable rod will pull the pulling rods downwards; simultaneously, the pulling rod will drive the ratchet wheel to change the date and the week-day.

Still another feature of the present invention is that the pulling rods for the date, the week-day and the month are furnished with positioning pieces respectively to stop the ratchet wheels in place after changing of loose-leaves. The ratchet wheel are furnished with their ratchet pawls respectively so as to prevent the ratchet wheels from rotating reversely.

A further feature of the present invention is that a control lever is fixed on the month pulling rod; upon the wheel and the ratchet wheel on the same shaft rotating to the front arm of the control lever, the front arm will engage with the notch of the wheel, while the rear arm will engage with the notches on the date and the month pulling rods respectively so as to pull the month pulling rod downwards upon the date pulling rod being pulled down, whereby the month loose-leaf can be changed.

A still further feature of the present invention is that the loose-leaves are mounted in the holes of the loose-leaf mounting wheels respectively; the loose-leaf mounting wheels are respectively rotated on the same shaft with their related ratchet wheels. The date loose-leaf mounting wheel has 31 holes, and the related ratchet wheel has 31 teeth. The week-day loose-leaf mounting wheel has seven or 14 holes, while the related ratchet wheel also has seven or 14 teeth. The month loose-leaf mounting wheel has 12 holes, while the related ratchet wheel also has 12 teeth. Therefore, the date, week-day, and month can be changed by means of the loose-leaf mounting wheels and their related ratchet wheel rotating together on the same shafts respectively.

Yet another feature of the present invention is that at the lower end of the date pulling rod is connected a string for pulling the pulling rod downwards so as to rotate the ratchet wheel to change the month manually when a month only has 28 or 30 days.

BRIEF DESCRIPTION OF THE DRAWINGS

FIG. 3-1 is a perspective view of an assembly in the present invention.

DETAILED DESCRIPTION

Figure 1:
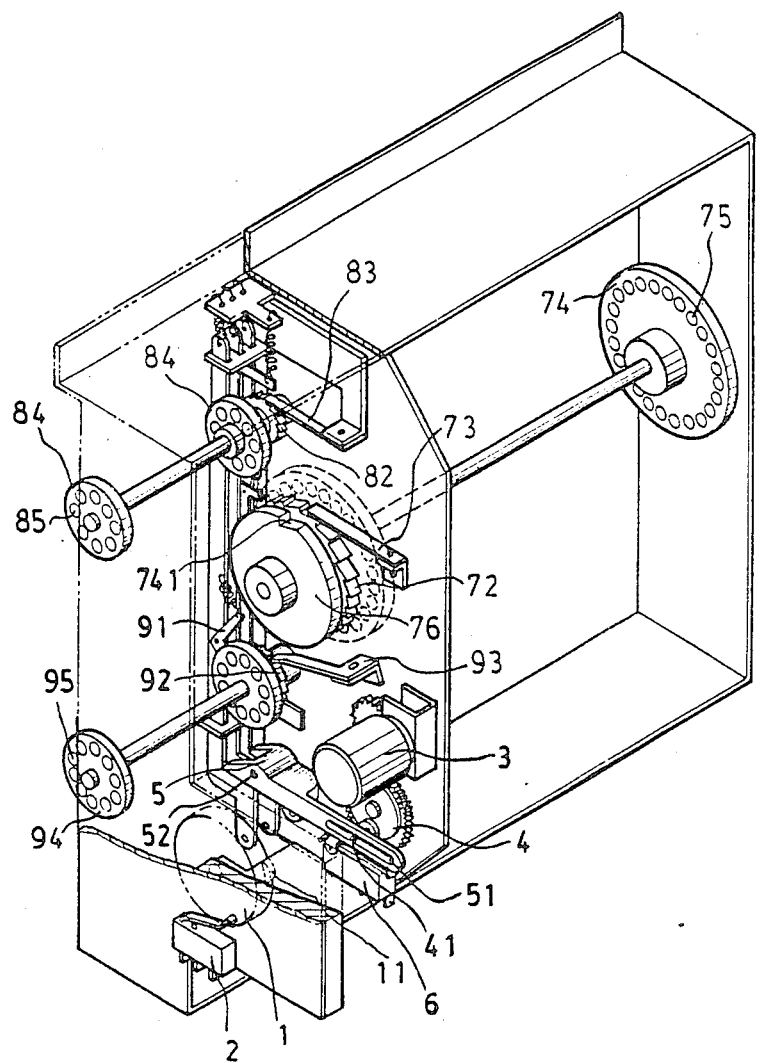
FIG. 1 is a perspective view of the interior components of the calendar of the present invention.
Figure 2:
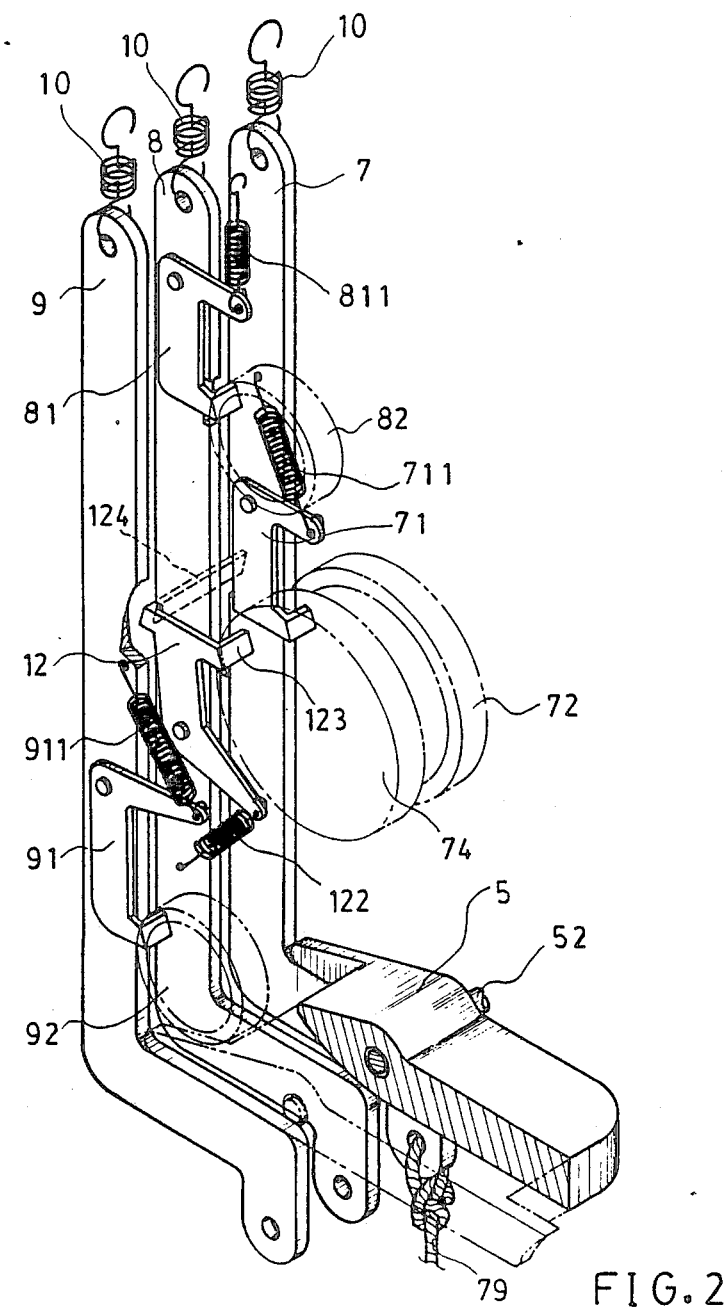
FIG. 2 is a perspective view of the arrangement of the pulling rods in the present invention.
Figure 3:
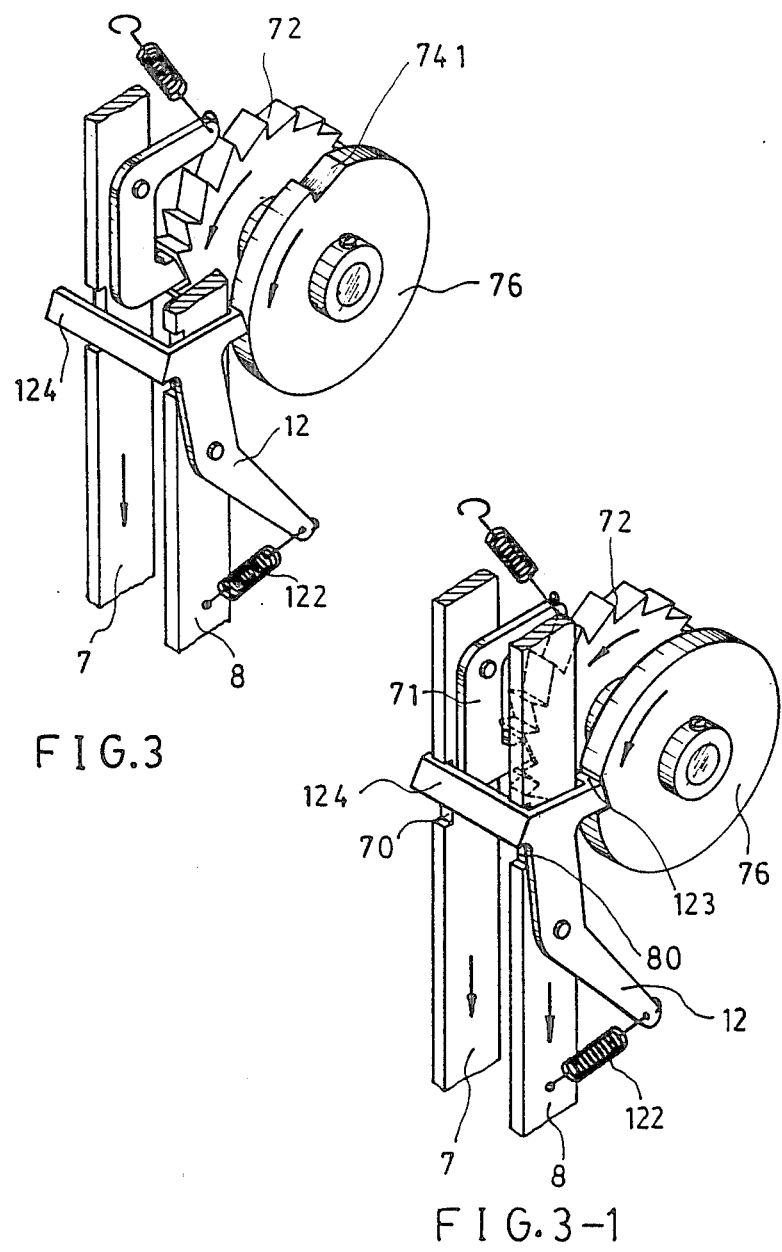
FIG. 3 is a perspective view of an assembly in the present invention.

Referring to FIG. 1, there are shown the interior components of the present invention, and is the lower portion is mounted a round wheel or case 1 being driven by a gear to rotate one cycle per 24 hours to be set with a timer (not shown). The round case 1 has a cam 11. Beneath the round case 1, there is provided a microswitch 2, which is electrically connected, through wires, to a battery and a motor 3. The motor 3 is mounted over an eccentric wheel 4, which is driven by the motor 3. The eccentric wheel 4 is furnished with a pin 41 that is movably arranged in a slot 51 of a retractable rod 5. The rear end of the retractable rod 5 is connected with the respective pulling rods for controlling the date and week, and the retractable rod 5 is pivoted on a fulcrum 52, and is driven, through the pin 41, by the eccentric wheel 4 to move up and down so as to pull down the pulling rods with its rear end. Under the retractable rod 5, there is mounted a micro-switch 6. The pulling rods 7, 8, and 9 generally L-shaped with a short downward extension of the horizontal leg and the rods 7 and 9 are connected with the rear end of the retractable rod. The pulling rod 8 is actuated with pulling rod 7 (as shown in FIG. 2). The top ends of the pulling rods 7, 8 and 9 are respectively biased by springs 10. Pulling rod 7 has mounted on it a positioning piece 71 which is controlled by a spring 711. The positioning piece 71 is fixed at a position after a ratchet wheel 72 has been rotated to re-set in place a loose leaf corresponding to a date(day). There is a ratchet pawl 73 (FIG. 3) is mounted in the vicinity of the ratchet wheel 72 to prevent the wheel 72 from rotating reversely. The ratchet wheel 72 and a wheel 76 are mounted on a same shaft for rotating on the same shaft. The wheel 76 is furnished with a notch 741, and at the pulling rod 8 is mounted a positioning piece 81 being pulled with tension by a spring 811. This positioning piece 81 can fix the ratchet wheel 82 in place after being rotated to re-set a loose leaf corresponding to a month. The ratchet wheel 82 is stopped in position with a ratchet pawl 83 (FIG. 1) to prevent the wheel 82 from rotating reversely. The pulling rod 8 is associated with a control lever 12 being pulled with tension by a spring 122. The front arm 123 of the control lever 12 can be precisely engaged in the notch 741 of the wheel 76 (as shown in FIGS. 3 and 3-1), while the rear arm 124 thereof is exactly engaged in the notches 70 and 80 of the pulling rods 7 and 8 so as to actuate the rod 8 to move downwards upon the rod 7 being pulled downwards. The pulling rod 9 is pulled with tension by spring 911 and is furnished with a positioning piece 91, which is used for fixing the ratchet wheel 92 in position after being rotated to re-set the loose-leaf corresponding to the week-day; a ratchet pawl 93 is also furnished to prevent the ratchet wheel 92 from rotating reversely. The shaft of the ratchet wheel 92 is also mounted in parallel with a loose-leaf mounting wheel 94 having seven (or 14) holes 95 so as to mount the loose-leaves for the week-days (not shown) in the holes thereon. The shaft of the ratchet wheel 82 is mounted in parallel with a loose-leaf mounting wheel 84 having 12 holes 85 for mounting the loose-leaves showing the months (not shown) in the holes thereon. Further, the shaft of the ratchet wheel 72 is also mounted in parallel with a loose-leaf mounting wheel 74 having 31 holes 75 for mounting the loose-leaves for the date (days) (not shown) in the holes thereon.

Figure 4:
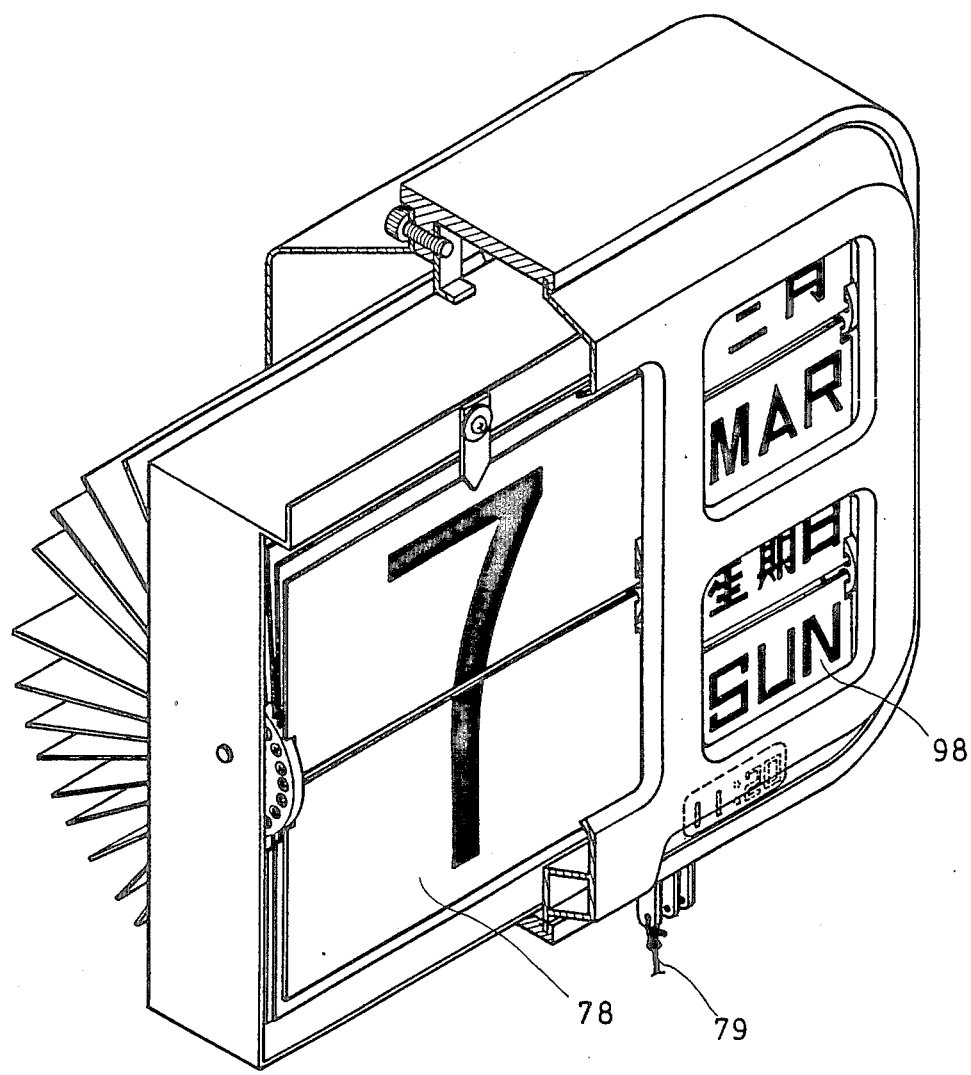
FIG. 4 is a perspective view of the forward side of the present invention after assembly.

With reference to FIG. 4, showing a perspective view of the present invention and FIG. 1, upon the round case 1 being set for 24 hours for rotating one cycle, the cam 11 will touch the micro-switch 2 to energize the motor 3, which will drive the eccentric wheel 4 to rotate; the pin 41 on the eccentric wheel 4 will drive the front end of the retractable rod 5 to swing upwards; upon swing to lowest point, the front end will touch the micro-switch 6 to turn off the power supply; simultaneously, the rear end of the retractable rod 5 will move downwards to pull the pulling rods 7 and 9 downwards. The positioning pieces 71 and 91 will also move downwards to cause the ratchet wheel 72 and the loose-leaf mounting wheel 74 to rotate simultaneously so as to have the date loose-leaves 78 rotated and advanced one date. When the ratchet wheel 92 and the loose-leaf mounting wheel 94 rotate simultaneously, the week-day loose-leaves 98 will be rotated and advanced one week-day; then, the positioning pieces 71 and 91 will be respectively engaged by the teeth due to of being pulled by the springs 711 and 911. Upon the wheel 76 rotating together with the ratchet wheel 72 day by day, the front arm 123 of the control lever 12 will maintain contact with the outer rim of the wheel 76 (as shown in FIG. 3) until the front arm 123 engages the notch 741 and the rear arm 124 engaged in the notches 70 and 80 of the pulling rods 7 and 8, and falling of the loose-leaf corresponding to the 31st of a month (as shown in FIG. 3-1). When the pulling rod 7 is pulled down again, the pulling rod 8 will be driven, by means of the rear arm 124, downwards. When this occurs, the positioning piece 81 will also move downwards together with the pulling rod 8, and the ratchet wheel 82 and the loose-leaf mounting wheel 84 will be rotated simultaneously. Upon changing the loose-leaf corresponding to the month, the positioning piece 81, being pulled by spring 811, and the pulling rod 8, being pulled by spring 10, will return to their original positions respectively. The front arm 123 will be disengaged from the notch 741 as a result of the wheel 76 rotating. The spring 122 will pull the control lever 12 back to its original position. Accordingly, the change of the date (day) and weekday can be made every day, while the month is to be changed after 31 days. In the event of a month having only 28 days or 30 days, one can pull a string 79 on the lower end of the pulling rod 7 so as to advance the ratchet wheel 72 by three teeth or one tooth, and then the pulling rod 7 will drive the pulling rod 8 downwards simultaneously so as to have the ratchet wheel 82 change the month automatically.

I claim:
1. An electric perpetual calendar, comprising:
 (a) a calendar housing;
 (b) a drive wheel rotatably journalled in said housing and adapted to be rotated by a respective gear through one cycle per 24 hours, and said drive wheel having on its peripheral edge a cam formation for actuation of a respective micro-switch;
 (c) a gear mounted in said housing for rotating said drive wheel through a respective cycle;
 (d) a micro-switch mounted in said housing and arranged in an electric circuit including at least one motor, whereby said micro-switch can be actuated by rotation of said drive wheel and contact of its cam formation;
 (e) an eccentric wheel journalled in said housing and including a pin, said eccentric wheel being driven to rotate by said at least one motor;
 (f) a retractable rod having a first, front end and a second, rear end remote from said front end, said front end having a slot formation for operatively receiving therein said pin of said eccentric wheel; and said rear end of said retractable rod being connected to respective pulling rods for control of the date and week-day indication in said calendar; and said retractable rod including a fulcrum about which said retractable rod is pivoted to swing up and down due to the respective movements imparted to it by said eccentric wheel and said pin in said slot formation;
 (g) a first pulling rod for setting a date, said first pulling rod having a first, top end and a second, lower end remote from said top end, said top end being biased by a respective spring, and said lower end being operatively connected to said retractable rod, and said lower end having a notch formation and a formation for securing a respective string;
 (h) a spring operatively connected in said calendar housing and at said top end of said first pulling rod;
 (i) a first positioning piece mounted laterally at said first pulling rod, said first position piece being adapted to operatively engage a respective ratchet wheel upon the changing of a date being completed;
 (j) a ratchet wheel rotatably mounted on a respective shaft in said housing for cooperation with said first positioning piece;
 (k) a second pulling rod for setting a month in said calendar, said second pulling rod having a first, top end biased by a respective spring, and said second pulling rod also having a notch formation;
 (l) a spring operatively connected in said calendar housing and at said top end of said second pulling rod;
 (m) a second positioning piece mounted laterally at said second pulling rod, said second positioning piece being adapted to operatively contact a respective ratchet wheel;

(n) a ratchet wheel rotatably mounted on a respective shaft in said housing for cooperation with said second positioning piece so as to be fixed in position on rotation;

(o) a control lever operatively mounted a said second pulling rod, said control lever having a first, front arm and a second, rear arm remote from said first arm, said front arm adapted to operatively contact a notch formation on a respective cam wheel, and said rear arm being adapted to engage said notch formation in said first and second pulling rods, whereby said first pulling rod for setting the date in said calendar and said second pulling rod for setting the month in said calendar are jointly moved so as to change the month;

(p) a cam wheel having at least one notch formation, said cam wheel mounted on a respective shaft in said housing;

(q) a third pulling rod for setting a week-day in said calendar, said third pulling rod having a first, top end and a second, lower end remote from said top end, said top end biased by a respective spring, and said lower end being operatively connected to said retractable rod;

(r) a spring operatively connected in said calendar housing and at said top end of said third pulling rod;

(s) a positioning piece laterally secured at said third pulling rod and adapted to operatively contact a respective ratchet wheel;

(t) a ratchet wheel operatively mounted on a respective shaft in said calendar housing for cooperation with said positioning piece of said third pulling rod for being engaged and fixed thereby upon a week-day being changed; and (u) for each pulling rod at least one shaft operatively journalled in said housing;

(v) for each pulling rod at least one pair of loose-leaf mounting wheels, with each pair being mounted on the respective shaft of the associated ratchet wheel, and about the rim of said wheels a plurality of holes is furnished for mounting respective loose-leaf date indicators; and (w) a plurality of loose leaves indicative of date, week-day, and month in said calendar, respectively arranged on corresponding pairs of wheels;

wherein upon said first and second, date pulling rods and said third, week-day pulling rod being pulled downwards, the respective ratchet wheels wll drive respective loose-leaf mounting wheels to rotate respectively to change the date and the week-day; and wherein said first, date pulling rod can, by way of said control lever, drive said second, month pulling rod downwards to cause the respective ratchet wheel to rotate the respective pair of loose-leaf mounting wheels for changing the loose-leaf indicative of the month.

2. The perpetual calendar as claimed in claim 1, wherein said loose-leaf mounting wheels are furnished respectively with 31 holes corresponding to the days of a month, with 12 holes corresponding to the months of a year, and with at leat 7 holes corresponding to a week.

3. The perpetual calendar as claimed in claim 1, wherein said front arm of said control lever is adapted to engage said notch formation of said cam wheel, and said rear arm of said control lever is engaged with said notch formation of said second pulling rod so as to have said second, month pulling rod driven downwards by said first, date pulling rod for automatically changing the month after every 31 days.

4. The perpetual calendar as claimed in claim 1, wherein said pulling rods are arranged in parallel and include substantially L-shaped bar elements.

* * * * *